(12) United States Patent
Ajiki et al.

(10) Patent No.: US 11,092,115 B2
(45) Date of Patent: Aug. 17, 2021

(54) CANISTER

(71) Applicant: FUTABA INDUSTRIAL CO., LTD., Okazaki (JP)

(72) Inventors: Shogo Ajiki, Okazaki (JP); Koji Iwamoto, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 16/599,158

(22) Filed: Oct. 11, 2019

(65) Prior Publication Data

US 2020/0124004 A1    Apr. 23, 2020

(30) Foreign Application Priority Data

Oct. 23, 2018 (JP) .............................. JP2018-199249

(51) Int. Cl.
*F02M 25/08* (2006.01)
*B60K 15/03* (2006.01)

(52) U.S. Cl.
CPC .... *F02M 25/0854* (2013.01); *F02M 25/0872* (2013.01); *B01D 2253/102* (2013.01); *B60K 2015/03236* (2013.01)

(58) Field of Classification Search
CPC ........... F02M 25/0854; F02M 25/0872; B01D 2253/102; B60K 2015/03236; B60K 15/03504
USPC ................................................. 123/518, 519
See application file for complete search history.

(56) References Cited

U.S. PATENT DOCUMENTS

| 4,306,894 | A | * | 12/1981 | Fukami | ............. B01D 53/0446 |
| | | | | | 123/519 |
| 4,338,106 | A | * | 7/1982 | Mizuno | ............. F02M 25/0854 |
| | | | | | 123/519 |
| 4,403,587 | A | * | 9/1983 | Mizuno | ............. F02M 25/0854 |
| | | | | | 123/519 |
| 4,448,594 | A | * | 5/1984 | Kozawa | ................. H01L 21/22 |
| | | | | | 123/519 |

(Continued)

FOREIGN PATENT DOCUMENTS

| JP | S58116751 U | 8/1983 |
| JP | H0452553 U | 6/1992 |

(Continued)

OTHER PUBLICATIONS

Notice of Reasons for Refusal for Japanese Patent Application No. 2018-199249, dated Dec. 22, 2020, 6 pages.

(Continued)

*Primary Examiner* — Sizo B Vilakazi
*Assistant Examiner* — Brian R Kirby
(74) *Attorney, Agent, or Firm* — Withrow & Terranova, P.L.L.C.; Vincent K. Gustafson

(57) ABSTRACT

A canister includes a filling chamber and a partition. The filling chamber is filled with activated carbon. The partition is arranged in the filling chamber, and has plate-like members extending in a flow direction that is a direction where the evaporated fuel flows. Also, the partition forms at least three flow paths defined by the plate-like members, and the partition includes an opening portion communicating with the at least three flow paths and allowing the evaporated fuel to be transferred to other flow paths.

13 Claims, 7 Drawing Sheets

(56) References Cited

U.S. PATENT DOCUMENTS

| | | | | |
|---|---|---|---|---|
| 4,454,849 A * | 6/1984 | Mizuno | ............. | F02M 25/0854 123/519 |
| 4,507,132 A * | 3/1985 | Yoshida | ............. | F02M 25/0854 123/519 |
| 4,750,923 A * | 6/1988 | Haruta | ............... | B01D 53/0415 55/319 |
| 4,877,001 A * | 10/1989 | Kenealy | ............. | F02M 25/0854 123/519 |
| 5,119,791 A * | 6/1992 | Gifford | ............. | F02M 25/0854 123/516 |
| 5,355,861 A * | 10/1994 | Arai | ................. | B60K 15/03504 123/519 |
| 5,398,660 A * | 3/1995 | Koyama | ............ | F02M 25/0854 123/519 |
| 5,538,542 A * | 7/1996 | Watanabe | .......... | B01D 53/0446 123/519 |
| 5,538,543 A * | 7/1996 | Watanabe | .......... | B01D 53/0446 123/519 |
| 5,645,036 A * | 7/1997 | Matsumoto | ........ | F02M 25/0854 123/516 |
| 5,779,773 A * | 7/1998 | Cam | .................. | B01D 53/0423 55/418 |
| 6,551,388 B1 * | 4/2003 | Oemcke | ............ | B01D 53/0415 123/519 |
| 6,599,350 B1 * | 7/2003 | Rockwell | ................ | B01D 45/12 123/519 |
| 6,913,001 B2 * | 7/2005 | Abdolhosseini | ... | F02M 25/0854 123/518 |
| 7,008,470 B2 * | 3/2006 | Makino | .................. | B01D 53/02 123/519 |
| 7,097,697 B2 * | 8/2006 | Nakamura | ......... | B01D 53/0431 123/519 |
| 7,222,612 B2 * | 5/2007 | Hagler | ............... | F02M 25/0854 123/516 |
| 7,294,179 B2 * | 11/2007 | Kim | .................... | B01D 53/0446 96/121 |
| 7,458,367 B2 * | 12/2008 | Kasuya | .............. | B01D 53/0415 123/519 |
| 7,699,042 B2 * | 4/2010 | Steinman | ............... | B01D 53/24 123/516 |
| 7,895,991 B2 * | 3/2011 | Lin | .................... | F02M 25/0854 123/519 |
| 8,801,840 B2 * | 8/2014 | Sugiura | .............. | B01D 53/0407 96/131 |
| 8,997,719 B2 * | 4/2015 | Kosugi | .................. | F02M 33/02 123/519 |
| 9,683,526 B2 * | 6/2017 | Matsuura | ............ | F02M 25/0854 |
| 2002/0023923 A1 * | 2/2002 | Zapp | ..................... | B60K 15/035 220/86.2 |
| 2004/0206240 A1 * | 10/2004 | Oh | ........................ | B01D 45/12 96/135 |
| 2005/0229787 A1 * | 10/2005 | Meiller | ............... | F02M 25/0854 96/152 |
| 2006/0065252 A1 * | 3/2006 | Meiller | ............... | F02M 25/0854 123/519 |
| 2006/0266220 A1 * | 11/2006 | Weber | ................. | F02M 25/0854 96/134 |
| 2009/0139495 A1 * | 6/2009 | Crawford | ........... | F02M 25/0854 123/519 |
| 2009/0293727 A1 * | 12/2009 | Defilippi | ............ | F02M 25/0854 96/149 |
| 2011/0167773 A1 * | 7/2011 | Eschlbeck | .......... | F02M 25/0854 55/282.2 |
| 2013/0025460 A1 * | 1/2013 | Yamanaka | ........ | B60K 15/03504 96/144 |
| 2013/0037006 A1 * | 2/2013 | Kosugi | .............. | B01D 53/0415 123/520 |
| 2013/0327303 A1 * | 12/2013 | Arase | ................. | B01D 53/0415 123/519 |
| 2014/0352541 A1 * | 12/2014 | Omichi | .............. | F02M 25/0854 96/152 |
| 2018/0134151 A1 * | 5/2018 | Lehmkul | .......... | B60K 15/03504 |
| 2018/0283322 A1 * | 10/2018 | Kuboyama | ........ | F02M 25/0836 |
| 2020/0011276 A1 * | 1/2020 | Murata | .............. | F02M 25/0854 |

FOREIGN PATENT DOCUMENTS

| | | | | |
|---|---|---|---|---|
| JP | H0942080 A | * | 2/1997 | ......... F02M 25/0854 |
| JP | 2009191688 A | | 8/2009 | |
| JP | 2012031785 A | | 2/2012 | |

OTHER PUBLICATIONS

Notice of Reasons for Refusal for Japanese Patent Application No. 2018-199249, dated Mar. 16, 2021, 8 pages including English translation.

First Office Action for Chinese Patent Application No. 201911010739.X, dated Apr. 23, 2021, 15 pages including English translation.

* cited by examiner

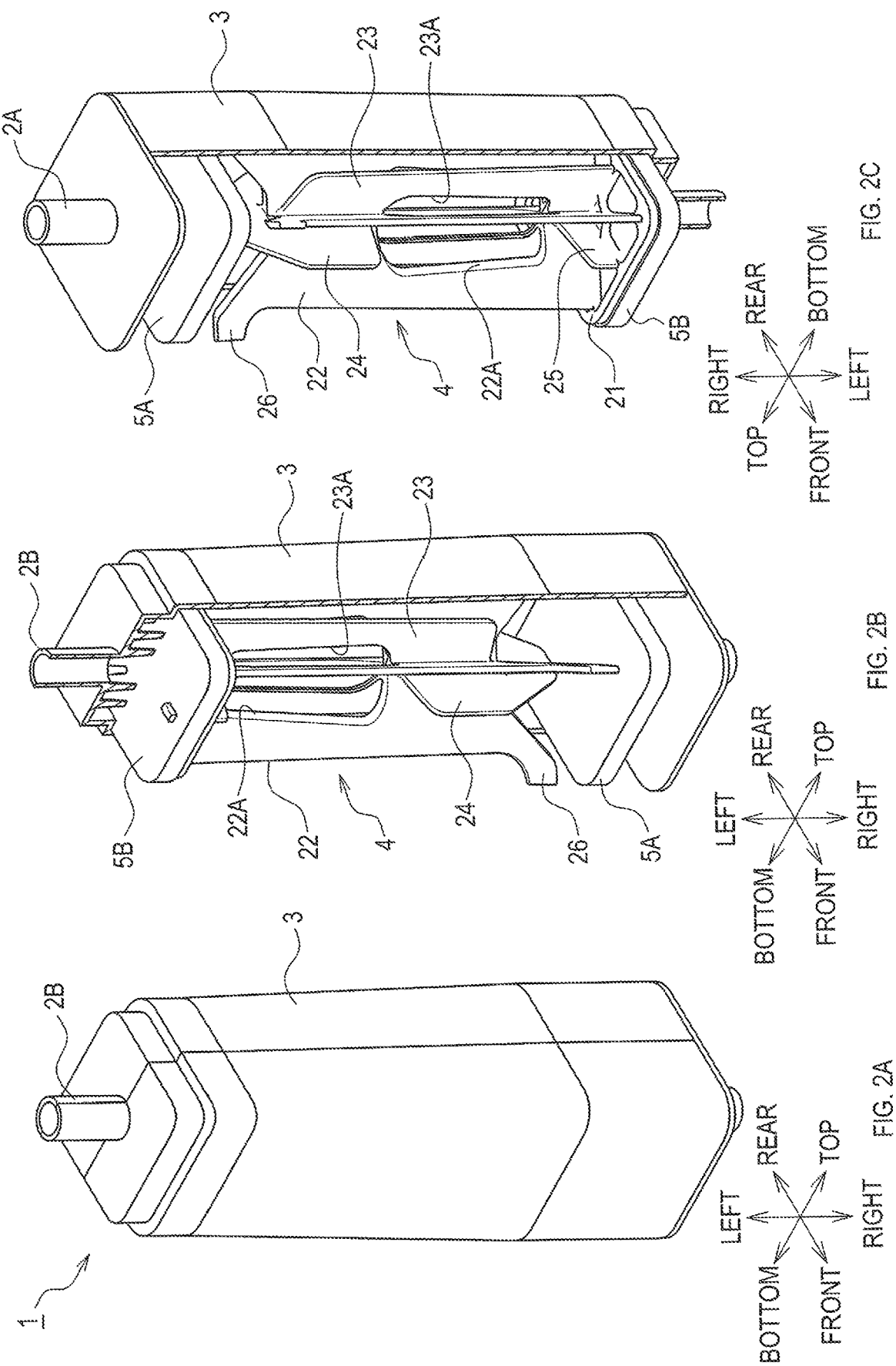

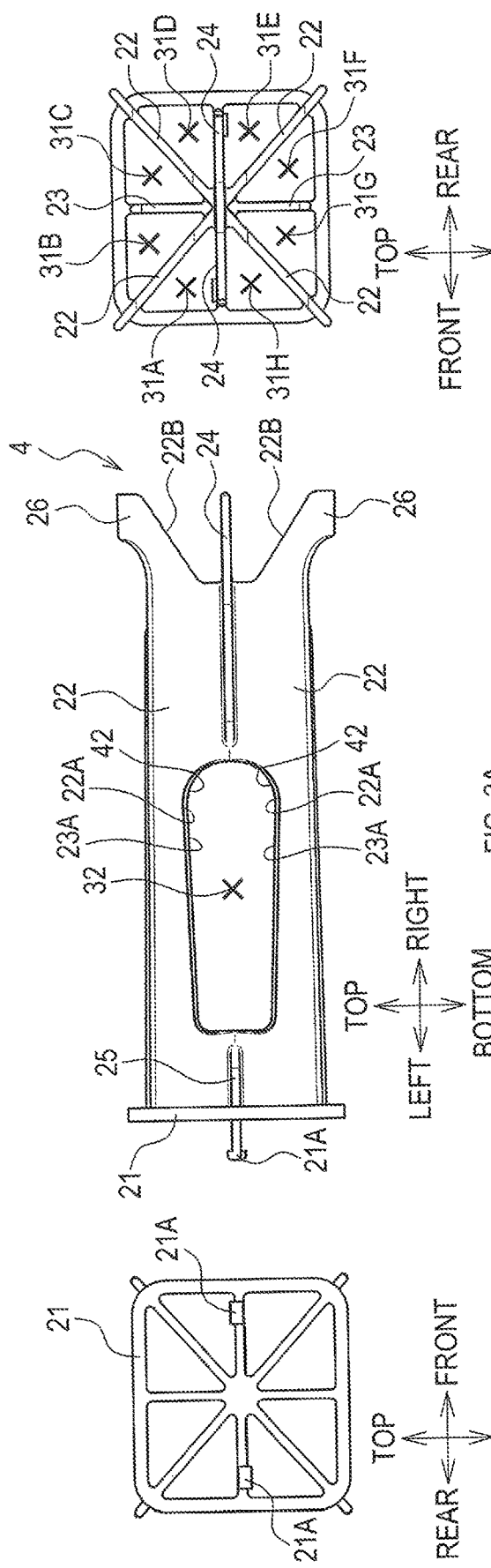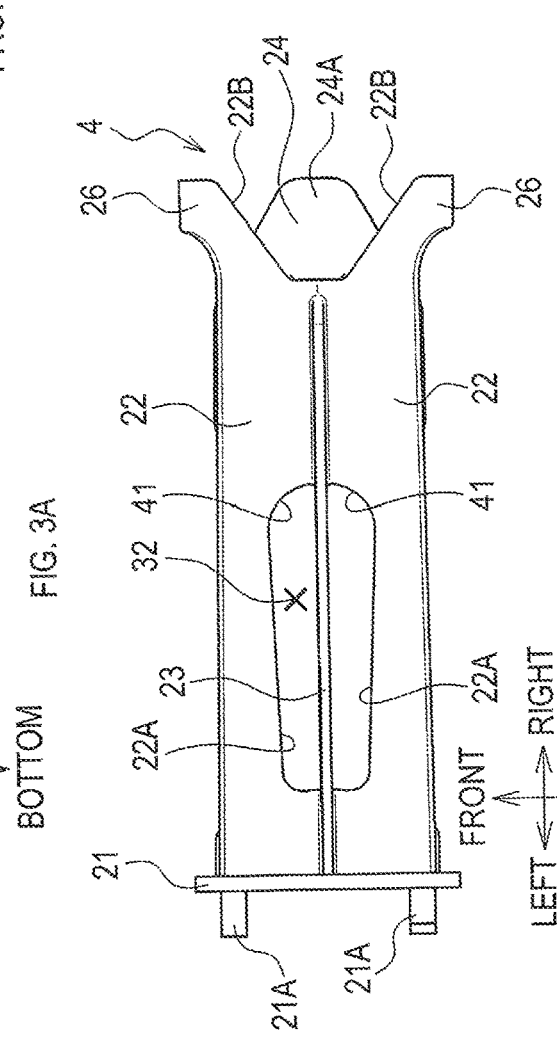

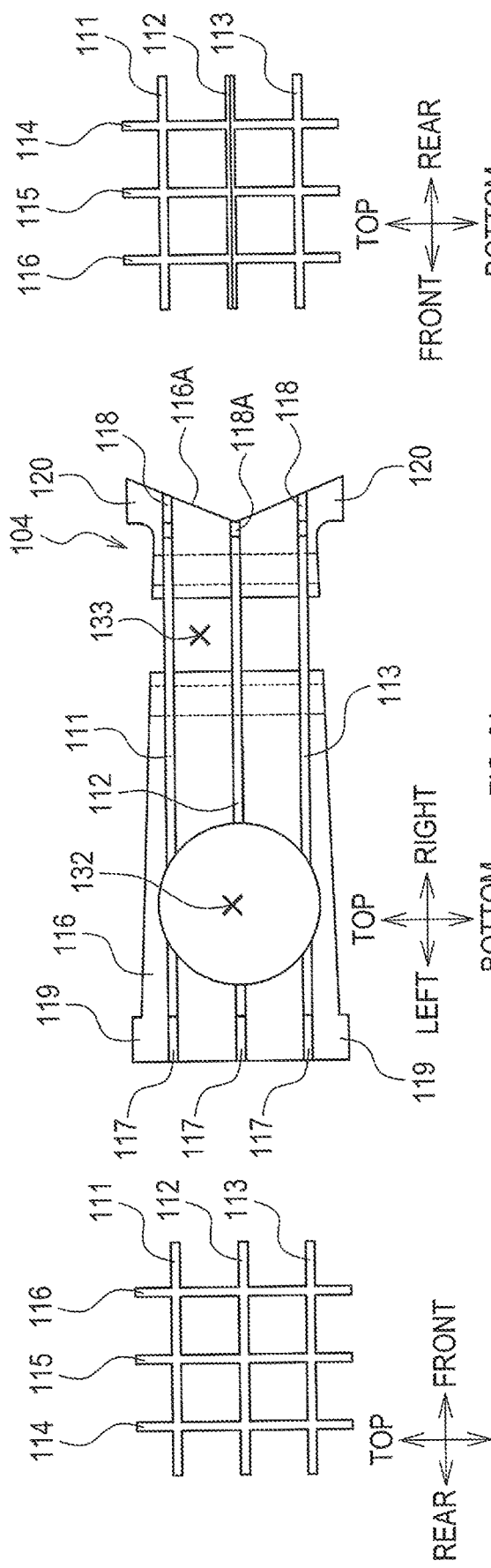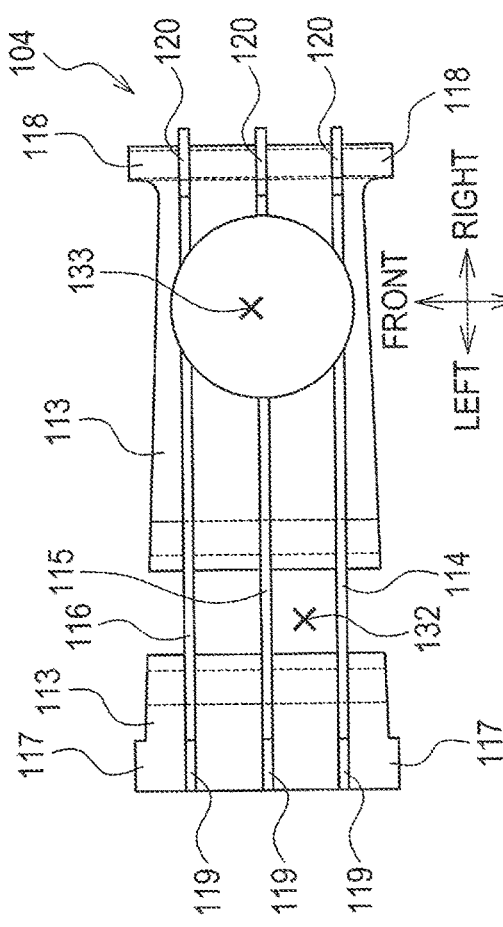
FIG. 6A  FIG. 6B  FIG. 6C  FIG. 6D

CANISTER

CROSS-REFERENCE TO RELATED APPLICATIONS

This application claims the benefit of Japanese Patent Application No. 2018-199249 filed on Oct. 23, 2018 with the Japan Patent Office, the entire disclosure of which is incorporated herein by reference.

BACKGROUND

The present disclosure relates to a canister.

A canister, which inhibits release of evaporated fuel to the atmosphere, is attached to a fuel tank of a vehicle. In the canister, the evaporated fuel is absorbed by activated carbon, and fuel is desorbed from the activated carbon by aspirated air for purging, and the purged fuel is supplied to an engine.

The activated carbon used for the canister is formed into a pellet shape or a granular shape, filled in a filling chamber of the canister, and pressurized with a spring and the like to reduce an occurrence of a clearance. Japanese Unexamined Utility Model Application Publication No. H04-52553 discloses a configuration in which a reinforcing plate is provided inside the filling chamber to inhibit wear and tear of the activated carbon.

SUMMARY

In recent years, more and more limitations have been imposed on an arrangement of the canister under a vehicle floor. Thus, the canister has been strongly demanded to have a smaller cross-section. In addition, an intake port and an exhaust port have been largely limited their flexible layouts. To maintain an adsorption performance even in a downsized canister, an improvement in a utilization efficiency of the activated carbon and a reduction of a ventilation pressure loss have been in demand.

A canister disclosed in the Japanese Unexamined Utility Model Application Publication No. H04-52553 achieves an excellent utilization efficiency of the activated carbon and a reduction of the ventilation pressure loss when a port is installed in a predetermined position. However, when the port is installed in a position different from the predetermined position due to some layout limitations, the reinforcing plate may inhibit a fuel gas from being dispersed, which may deteriorate an efficient use of the entire activated carbon.

As one aspect of the present disclosure, it is preferable to provide a canister that can improve the utilization efficiency of the activated carbon.

One embodiment of the present disclosure is a canister that absorbs and desorbs evaporated fuel generated in a fuel tank of a vehicle. The canister comprises a filling chamber and a partition. The filling chamber is filled with activated carbon. The partition is located in the filling chamber and has plate-like members extending in a flow direction where the evaporated fuel flows. Also, the partition forms at least three flow paths defined by the plate-like members, and the partition includes an opening portion communicating with the at least three flow paths and allowing the evaporated fuel to be transferred to other flow paths.

With this configuration, the evaporated fuel flowing through one of the at least three flow paths can be transferred to any of at least two flow paths via the opening portion. Thus, it is possible to inhibit imbalance in flows of the evaporated fuel passing through the flow paths, and to improve the utilization efficiency of the activated carbon.

In the above-described canister, the partition extends towards an inner wall surface forming the filling chamber, and the partition may be provided with a restriction that limits a movement range of the partition in a direction crossing the flow direction. With this configuration, it is possible to inhibit the partition from being moved in a wide range inside the filling chamber, and to reduce damage to the activated carbon caused by a collision of the activated carbon with the partition plate.

In the above-described canister, at least a part of the plate-like members may have a tapered shape at one end in the flow direction. With this configuration, when the activated carbon is introduced into the filling chamber with the one end facing up, the activated carbon slides down along the end of each of the plate-like members. Thus, it is possible to smoothly fill with the activated carbon.

In the partition of the above-described canister, each of the plate-like members includes a first edge forming an outer edge of the opening portion, and the first edge may have a curved shape in at least one end in the flow direction. With this configuration, clearances can be reduced in the opening portion at the time of filling with the activated carbon compared with the case where an edge forming the outer edge of the opening portion has a square shape.

In the above-described canister, each of the plate-like members may have a clearance between the inner wall surface of the filling chamber in at least a part of a range in the flow direction. With this configuration, when the partition is vibrated, it is possible to inhibit the damage to the activated carbon held between the inner wall surface and the partition.

In the above-described canister, the plate-like members may be arranged radially. With this configuration, the flow paths formed by the plate-like members may be arranged in a well-balanced manner in the filling chamber. Thus, it is possible to inhibit imbalance in a utilization rate of the activated carbon among flow paths.

BRIEF DESCRIPTION OF THE DRAWINGS

Hereinafter, example embodiments of the present disclosure will be described with reference to the accompanying drawings, in which:

FIG. 2A is a perspective view of the canister according to the first embodiment, FIG. 2B is a perspective view showing the filling chamber and the atmosphere port in FIG. 2A in a partial sectional view, and FIG. 2C is a perspective view of the canister seen from a different viewpoint from that of FIG. 2B;

FIG. 3A is a front view of a partition according to the first embodiment, FIG. 3B is a bottom view of the partition according to the first embodiment, FIG. 3C is a left side view of the partition according to the first embodiment, and FIG. 3D is a right side view of the partition according to the first embodiment;

FIG. 6A is a front view of a partition according to the second embodiment, FIG. 6B is a bottom view of the partition according to the second embodiment, FIG. 6C is a left side view of the partition according to the second embodiment, and FIG. 6D is a right side view of the partition according to the second embodiment.

DETAILED DESCRIPTION OF THE EXEMPLARY EMBODIMENTS

1. First Embodiment

1-1. Overall Configuration

Figure 1:
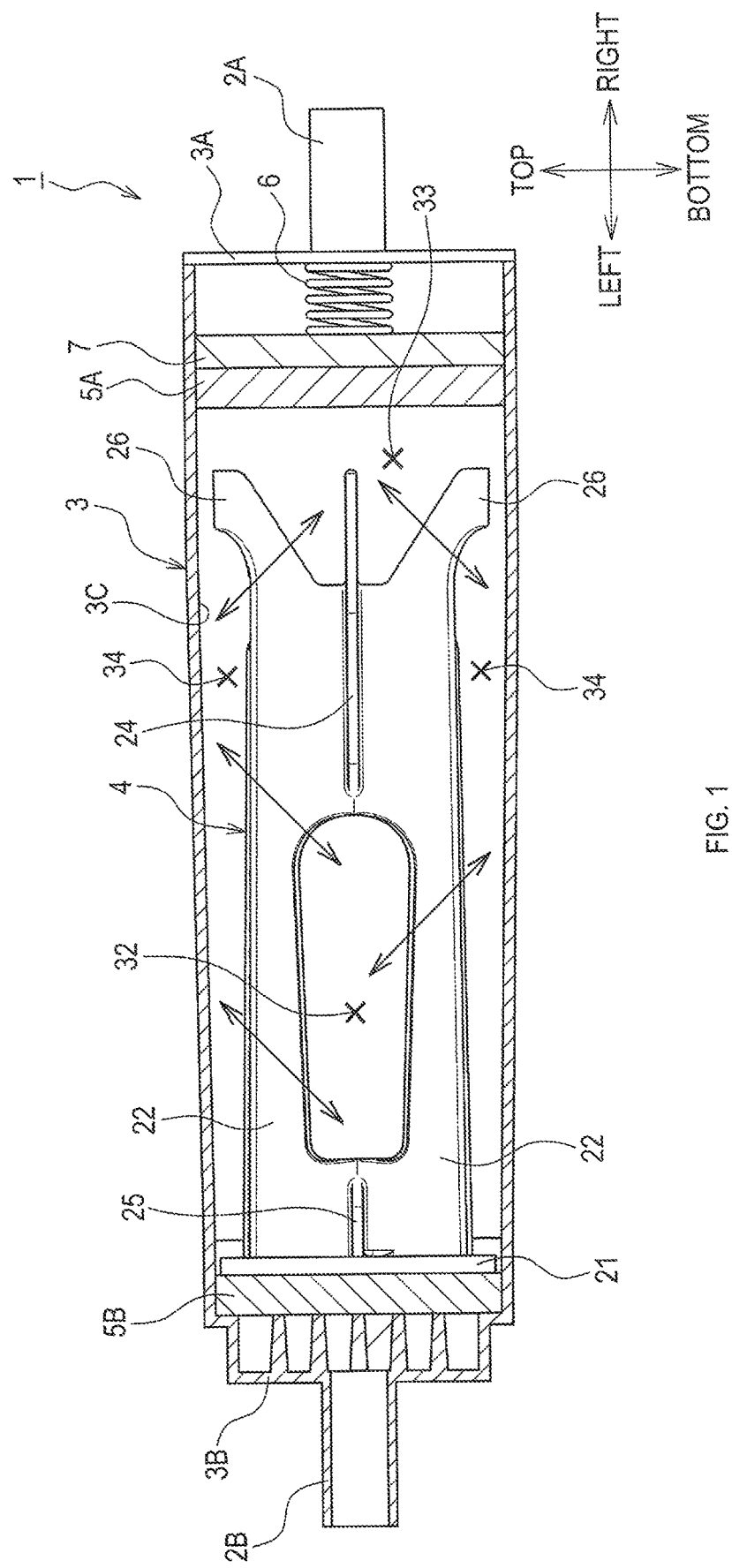
FIG. 1 is a front view of a canister according to a first embodiment where a filling chamber and an atmosphere port are shown in a partial sectional view.
Figure 4A:
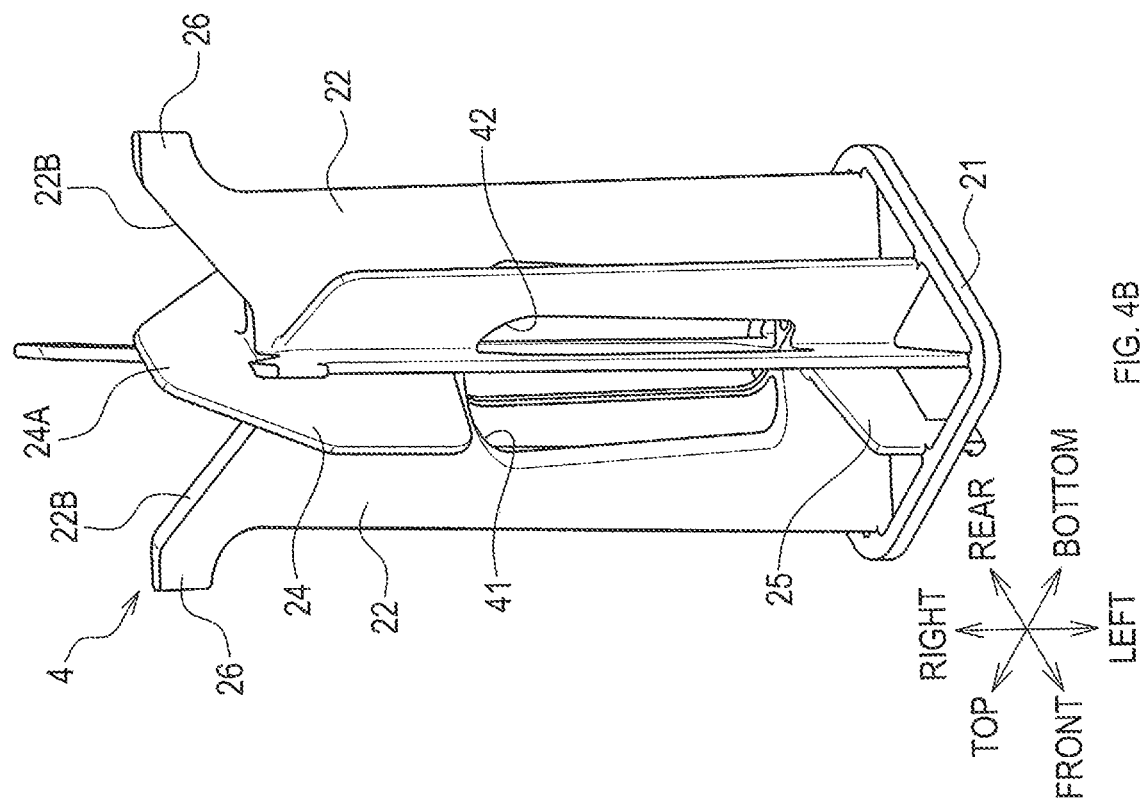
FIG. 4A is a perspective view of the partition in FIG. 3.
Figure 4B:
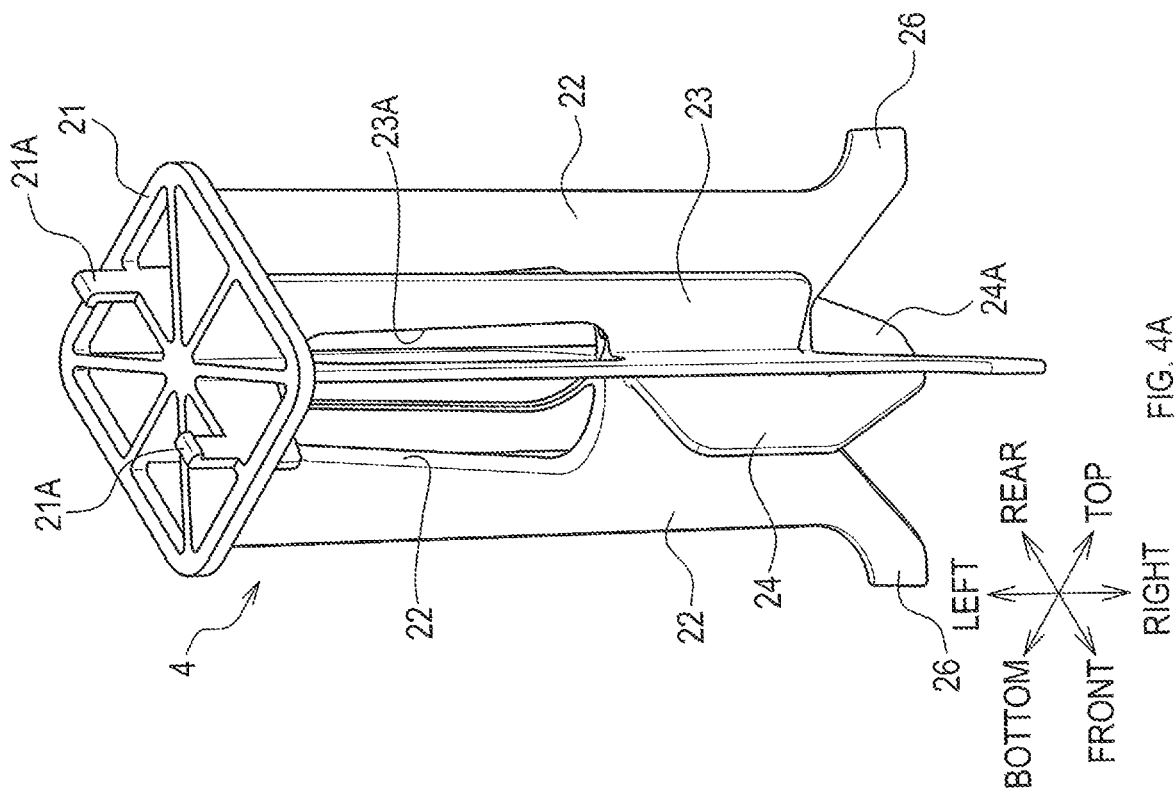
FIG. 4B is a perspective view of the partition seen from a different viewpoint from that of FIG. 4A.

A canister 1 shown in FIG. 1 and FIG. 2A to FIG. 2C absorbs and desorbs evaporated fuel generated in a fuel tank of a vehicle. The canister 1 comprises a charge port 2A, an atmosphere port 2B, a filling chamber 3, a partition 4, a first filter 5A, and a second filter 5B. The canister 1 is filled with activated carbon. However, the activated carbon is not shown to simplify the description.

1-2. Port

The charge port 2A is connected to the fuel tank of the vehicle via piping. The charge port 2A is configured to take the evaporated fuel generated in the fuel tank into the filling chamber 3.

The atmosphere port 2B is connected to a drain filter and the like via piping, and is open to the atmosphere. The atmosphere port 2B releases gas from which the evaporated fuel has been removed to the atmosphere. Also, the atmosphere port 2B takes in external air (that is, purge air) to desorb (that is, purge) the evaporated fuel absorbed in the filling chamber 3.

Although it is not shown, the canister 1 further comprises a purge port. The purge port is connected to an intake pipe of an engine of the vehicle via a purge valve. The purge port is configured to discharge the evaporated fuel contained in the filling chamber 3 from the filling chamber 3 and supply the evaporated fuel to the engine.

The atmosphere port 2B is located at a position opposite to the charge port 2A and the purge port, with the filling chamber 3 interposed therebetween. However, an arrangement of each port is not limited to the above position.

In the description below, a direction where the charge port 2A is located is defined as a right direction, a side where the atmosphere port 2B is located is defined as a left direction, and directions perpendicular to the right direction and the left direction are defined as a front-rear direction and an up-down direction. These definitions of the directions are used to easily describe a shape of the canister, and not to limit the configuration and embodiments of the canister.

1-3. Filling Chamber

The filling chamber 3 has a space storing the activated carbon to absorb the evaporated fuel taken from the charge port 2A. Also, the filling chamber 3 is configured to discharge the absorbed evaporated fuel through the purge port.

The filling chamber 3 is a hollow tubular body extending in a left-right direction. A sectional shape of the filling chamber 3 is not constant in a longitudinal direction of the filling chamber 3. In particular, a size of an outer shape of the filling chamber 3 slightly increases from the left direction to the right direction. As a matter of course, the shape of the filling chamber 3 is not limited to this. For example, the filling chamber may be a tubular body having a sectional shape of quadrangular, circular, or any other shapes.

At the end in the right direction of the filling chamber 3, a first bottom wall 3A is provided, and at the end in the left direction, a second bottom wall 3B is provided. The charge port 2A and the purge port are connected to the first bottom wall 3A. The atmosphere port 2B is connected to the second bottom wall 3B.

The first filter 5A is located inside the first bottom wall 3A of the filling chamber 3. Also, the second filter 5B is located inside the second bottom wall 3B. The activated carbon is filled in a space between the first filter 5A and the second filter 5B of the filling chamber 3.

Each of the first filter 5A and the second filter 5B is configured so that the activated carbon cannot pass through, but the evaporated fuel can pass through. Also, between the first filter 5A and the first bottom wall 3A, an elastic body 6 that urges the first filter 5A towards the left direction via a grid 7 is provided. The elastic body 6 may be a spring, and the grid 7 is configured to allow the evaporated fuel to pass through.

The first bottom wall 3A is separated from a tubular main body of the filling chamber 3 before filling the filling chamber 3 with the activated carbon. The process of filling the filling chamber 3 with the activated carbon may include inserting the partition 4 into the filling chamber 3, introducing the activated carbon with the right end of the canister 1 facing up, and fixing the first bottom wall 3A to the tubular main body of the filling chamber 3 by welding or the like.

In the filling chamber 3, the evaporated fuel flows in the left-right direction between the atmosphere port 2B and the charge port 2A while being in contact with the activated carbon, that is, passing through the activated carbon layer. That means the left-right direction is a flow direction where the evaporated fuel flows.

In the filling chamber 3, the partition 4 forms flow paths. Here, the flow path is a path formed by the plate-like members, and the flow path allows the evaporated fuel to flow and restricts a flow in a direction crossing the flow direction of the evaporated fuel. When the evaporated fuel flows inside the filling chamber 3, the evaporated fuel is restricted from transferring between flow paths.

1-4. Partition (i) Configuration of Partition

As shown in FIG. 3A to 3D and FIG. 4A, 4B, the partition 4 comprises a support frame 21, four first plate-like members 22, two second plate-like members 23, two third plate-like members 24, and two fourth plate-like members 25. The four first plate-like members 22, the two second plate-like members 23, the two third plate-like members 24, and the two fourth plate-like members 25 are hereinafter collectively described as "the plate-like members". Each of the plate-like members is a plate-like member extending in the left-right direction, that is, in the above-described flow direction.

The support frame 21 has a frame portion having an outer circumference shape substantially same as a sectional shape of the filling chamber 3. The support frame 21 supports the plate-like members. The support frame 21 does not have a wall surface to close the inside of the filling chamber 3 in the left-right direction, and thus, the evaporated fuel can freely pass through the support frame 21. The support frame 21 is provided with two projections 21A formed thereon, and these projections 21A may fix the second filter 5B to the support frame 21.

As shown in FIG. 3D, the plate-like members are arranged radially from a center of a section of the filling chamber 3. The four first plate-like members 22 are positioned on straight lines connecting between a center of the filling chamber 3 and four corners of the sectional shape. The two second plate-like members 23 are arranged so that one faces an upper side and the other faces a lower side. Also, the two third plate-like members 24 are arranged so that one faces a rear side and the other faces a front side.

Each of the four first plate-like members 22 has a through hole 22A on a side of a central axis of the filling chamber 3. Also, an end of each of the four first plate-like members 22 in the right direction has a slope portion 22B inclined towards the side of the central axis and the left side of the filling chamber 3. With the slope portion 22B, each of the four first plate-like members 22 has a tapered shape where a width of the plate-like member at the end in the right direction gradually decreases.

As shown in FIG. 1, each of the four first plate-like members 22 is provided with a restriction 26 projecting towards an inner wall surface 3C forming an inner space of the filling chamber 3. Each of the four restriction 26 projects towards the four different corners of the filling chamber 3. The restriction 26 restricts a movement range of the partition 4 in directions crossing the flow direction, that is, in the up-down direction and the front-rear direction, by being in contact with the inner wall surface 3C. Further, stiffness of the filling chamber 3 can be improved by the restriction 26 being in contact with the filling chamber 3 from the inside. There may be a clearance between the restriction 26 and the inner wall surface 3C as shown in FIG. 1. However, the actual clearance is smaller than the clearance shown in FIG. 1 since the four corners of the filling chamber 3 are curved. It is to be noted that the clearance may not be formed, or a small clearance may be formed between the restriction 26 and the inner wall surface 3C.

Each of the two second plate-like members 23 has a through hole 23A formed on the side of the central axis of the filling chamber 3.

The two third plate-like members 24 are formed into one plate by integrating a portion extending in the front direction with a portion extending in the rear direction. An end of each of the two third plate-like members 24 in the right direction is provided with a tapered leading end 24A where a width of the central portion gradually decreases. The two third plate-like members 24 are fixed to the support frame 21 via the first plate-like member 22.

The two fourth plate-like members 25 are arranged at a position overlapped with the two third plate-like members 24 when seen from the end in the right direction or the end in the left direction, and the two fourth plate-like members 25 are arranged so as to be spaced apart from the two third plate-like members 24 in the left direction.

(ii) Flow Path

As shown in FIG. 3D, the plate-like members that the partition 4 comprises forms eight flow paths (a flow path 31A to a flow path 31H) in the filling chamber 3. The evaporated fuel flowing from the charge port 2A into the filling chamber 3 is restricted from being transferred in the directions crossing the flow direction, that is, in the up-down direction and the front-rear direction, due to the plate-like members. It is to be noted that the partition 4 is not limited to a configuration in which a transfer of the evaporated fuel to other flow paths is completely blocked. Alternatively, relatively small amount of the evaporated fuel may be able to be transferred to other flow paths. For example, the evaporated fuel can be transferred from the clearances (clearances 34 as described below) formed between the partition 4 and the inner wall surface 3C.

(iii) Opening Portion

As shown in FIG. 3A, FIG. 3B and the like, the partition 4 comprises an opening portion 32. The opening portion 32 includes the through hole 22A, the through hole 23A, and a gap formed between the third plate-like member 24 and the fourth plate-like member 25 in the left-right direction. The opening portion 32 communicates with all eight flow paths. Thus, the evaporated fuel can be transferred to all eight flow paths 31A to 31H by passing through the opening portion 32.

(iv) Other Features of Partition

An edge 41 on the right side of the through hole 22A and an edge 42 on the right side of the through hole 23A, that is, the right end edges, in the edges forming an outer edge of the opening portion 32, have a curved shape that is convex towards outside. The curved shape as used herein means that the edges of the through holes have a curved shape swelled towards outside the opening portion 32.

Also, the partition 4 is formed to be sufficiently shorter than a longitudinal length of the inside of the filling chamber 3. Thus, when the partition 4 is mounted closer to the left side in the filling chamber 3, a space 33 is formed on the right side of the partition 4.

Also, as shown in FIG. 1, the clearances 34 are formed between an outer periphery of the first plate-like member 22 and the inner wall surface of the filling chamber 3 except a position where the restrictions 26 is formed on the right end of the first plate-like member 22.

1-5. Effect

According to the first embodiment detailed in the above, the following effects can be obtained.

(1a) The canister 1 comprises the partition 4, and the partition 4 is configured by the plate-like members. When the plate-like members are installed in the filling chamber 3, filling density of the activated carbon decreases, thereby achieving a reduction of a ventilation pressure loss.

(1b) In the canister 1, all eight flow paths through which the evaporated fuel flows communicate with each other via the opening portion 32, and the evaporated fuel can be transferred to each flow path via the opening portion 32. Thus, the imbalance in the flow of the evaporated fuel passing through the flow paths is reduced, thereby improving a utilization efficiency of the activated carbon.

Also, even when the port is provided at a position shifted from the center of the first bottom wall 3A and/or the second bottom wall 3B in the canister 1, the imbalance in the flow of the evaporated fuel passing through flow paths can be reduced since the opening portion 32 facilitates the evaporated fuel to spread to all flow paths. Thus, it is possible to reduce imbalance in the activated carbon used in the canister 1.

In the filling chamber 3, the evaporated fuel can flow not only in the left-right direction, but also in the directions shown by arrows in FIG. 1, for example. It should be noted that those arrows are one example of flow directions, and the evaporated fuel can flow in various directions.

(1c) The partition 4 comprises four restrictions 26. These four restrictions 26 can inhibit the partition 4 from moving in the filling chamber 3.

(1d) The first plate-like member 22 has the slope portion 22B formed on the right end thereof. Thus, the right end of the partition 4 has a tapered shape. Because of this, when the activated carbon is introduced with the right end of the filling chamber 3 facing up, the activated carbon is unlikely to be accumulated on the slope portion 22B, thereby enabling a smooth filling with the activated carbon.

Also, in the edge configuring the outer edge of the opening portion 32, the edge 41 on the right side of the first plate-like member 22 and the edge 42 on the right side of the second plate-like member 23 have a curved shape that is convex towards outside. With such shape of the edges configuring the outer edge of the opening portion 32, the opening portion 32 can be filled with the activated carbon without unnecessary clearances at the time of introducing the activated carbon and gradually accumulating the activated carbon from the left end positioned on the lower side.

(1e) The clearance 34 is provided between the first plate-like member 22 and the inner wall surface 3. Thus, for example, when the canister 1 is vibrated by a vibration of a vehicle, it is possible to inhibit damage to the activated carbon caused by a large vibration of the partition 4. When granular activated carbon is sandwiched, ground, and chipped, the activated carbon may clog the first filter 5A and the second filter 5B. This may cause unwilling changes of the pressure loss and a flow condition of the evaporated fuel, and it becomes difficult for the canister to exhibit stable performance. However, since the canister 1 of the present embodiment inhibits the damage to the activated carbon, the stable performance can be achieved.

(1f) Since the partition 4 is formed to be sufficiently shorter than the longitudinal length of the inside of the filling chamber 3, the space 33 can be formed on the right side of the partition 4. This widens a range where the first filter 5A can exist in the left-right direction. Thus, even if a filling amount of the activated carbon is different, or even if the activated carbon are gradually stuffed on the left side due to use of the canister 1, the first filter 5A can be inhibited from being in contact with the partition 4. Consequently, it is possible to inhibit deficiency in pressure caused by abutting the first filter 5A with the partition 4, and to impart stable pressure to the activated carbon by the elastic body 6.

(1g) The plate-like members of the partition 4 is fixed to the support frame 21. Thus, at the time of installing the partition 4 in the filling chamber 3, the installation only requires to insert the partition 4 into the filling chamber 3 without adhesion or the like of each of the plate-like members. Therefore, an assembly workability improves.

1-6. Modified Examples of First Embodiment

In the first embodiment, a configuration is exemplified in which in the edge forming the outer edge of the opening portion 32 of the plate-like members, the edge on the right side of the opening portion 32 has a curved shape that is convex towards outside. However, in the edge forming the outer edge of the opening portion 32, either one edge at the right end or the left end may have the curved shape. Alternatively, the curved shape may not be formed along the edge. In this first embodiment, the curved shape provided at the right end highly inhibit generation of clearances at the time of introducing the activated carbon.

Also, in the first embodiment, the clearance 34 is provided in a wide range in the left-right direction except a position where the restriction 26 is provided. However, the clearance may be provided in a narrower range, or the clearance may not be provided. The wider the range of the clearance in the left-right direction is, the more the crushing of the activated carbon can be inhibited.

Also, the partition 4 may additionally comprise a flow regulation plate regulating the flow of the evaporated fuel. Installing the flow regulation plate can further reduce the filling density of the activated carbon, which can reduce the ventilation resistance.

In the first embodiment, the canister having eight flow paths has been described. However, similar effects as described above can be obtained with a canister in which at least three flow paths are formed.

2. Second Embodiment

[2-1. Difference from First Embodiment]

A canister of a second embodiment is different from the canister of the first embodiment only in a shape of the partition. Thus, descriptions of common configurations are omitted, and different configurations will be mainly described. The same reference numeral used in the first embodiment denotes the same configuration, and reference should be made to the preceding description.

Figure 5:
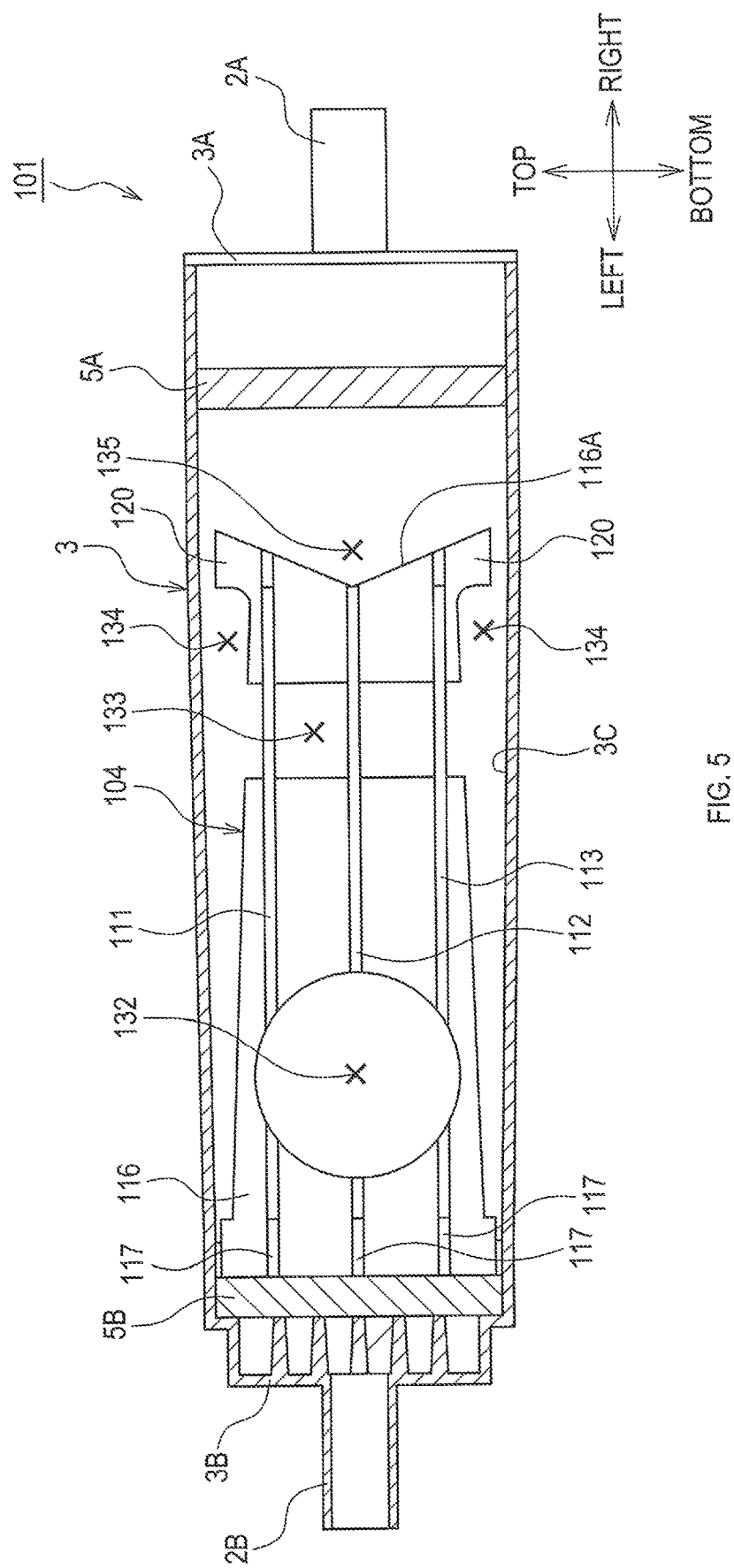
FIG. 5 is a front view of a canister according to a second embodiment where only a filling chamber is shown in a partial sectional view.
Figure 7B:
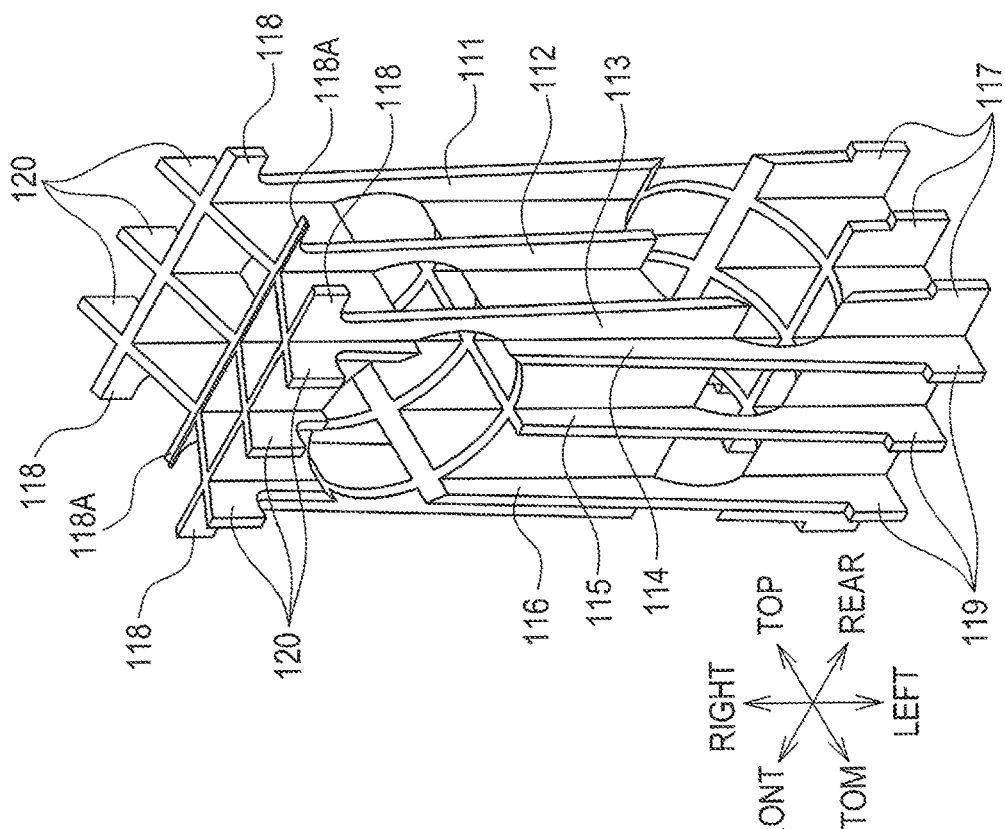
FIG. 7B is a perspective view of the partition seen from a different viewpoint from that of FIG. 7A.
Figure 7A:
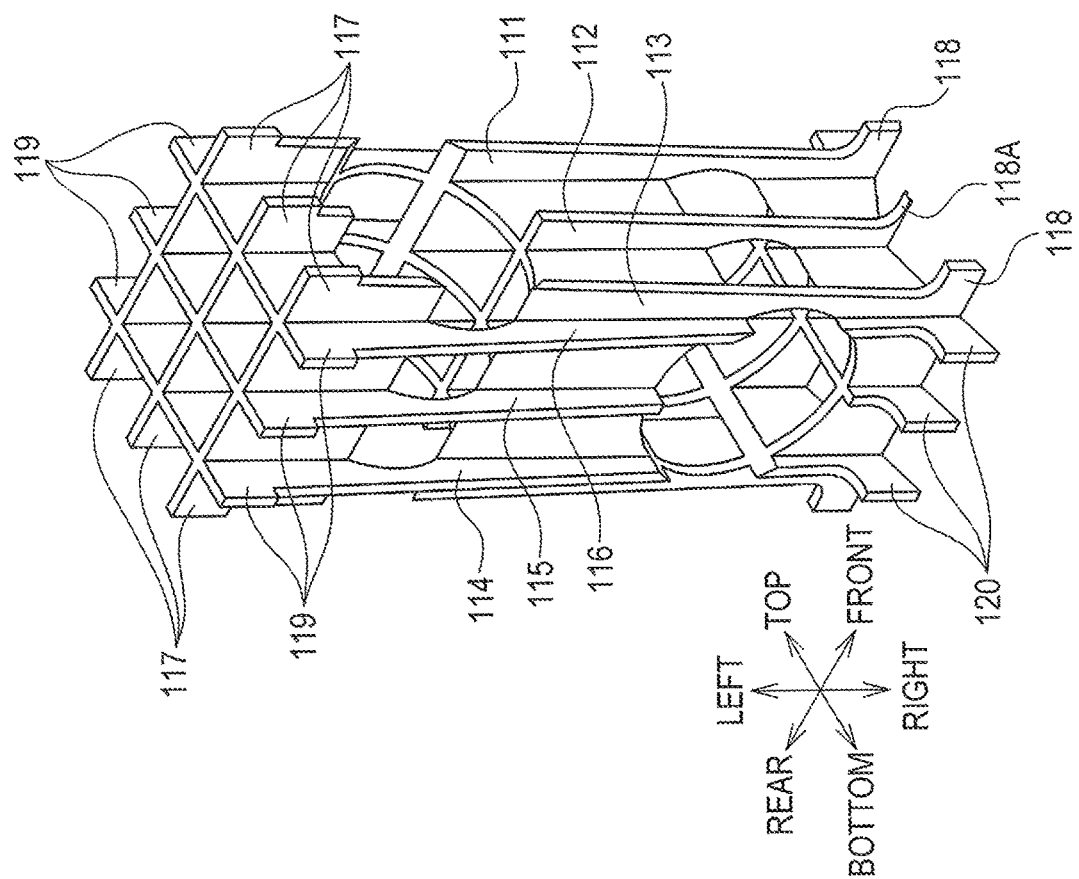
FIG. 7A is a perspective view of the partition in FIG. 6.

A canister 101 in the second embodiment is shown in FIG. 5. The canister 101 comprises a partition 104 in the filling chamber 3. The partition 104 in the second embodiment has latticed flow paths formed by plate-like members.

As shown FIGS. 6A, 6B, 7A, and 7B, the partition 104 comprises a first horizontal plate 111, a second horizontal plate 112, a third horizontal plate 113, a first vertical plate 114, a second vertical plate 115, and a third vertical plate 116. The first horizontal plate 111, the second horizontal plate 112, and the third horizontal plate 113 are arranged parallel to each other. The first vertical plate 114, the second vertical plate 115, and the third vertical plate 116 are arranged parallel to each other.

The partition 104 is provided with a first opening portion 132 and a second opening portion 133. The first opening portion 132 is a through hole formed by hollowing out the partition 104 in the front-rear direction crossing the left-right direction. The second opening portion 133 is a through hole formed by hollowing out the partition 104 in the up-down direction crossing the left-right direction.

The partition 104 has 16 flow paths 31A-31H defined by the horizontal plates 111-113 and the vertical plates 114-116. These flow paths 31A-31H communicate with each other via the first opening portion 132 and the second opening portion 133. Thus, the evaporated fuel can be transferred to other flow paths.

A specific shape of each plate forming the partition 104 will be described.

The first horizontal plate 111 and the third horizontal plate 113 have a symmetric shape about the second horizontal plate 112. The first horizontal plate 111, the second horizontal plate 112, and the third horizontal plate 113 are provided on both left and right sides with the first opening portion 132 interposed therebetween.

As shown in FIG. 6B, at an end in the left direction of the third horizontal plate 113, a first restriction 117 projecting in the front-rear direction is formed. Also, at an end in the right direction of the third horizontal plate 113, a second restriction 118 projecting in the front-rear direction is formed. At an end in the left direction of the second horizontal plate 112, the first restriction 117 projecting in the front-rear direction is formed as in the case of the third horizontal plate 113. As shown in FIG. 6A, at an end in the right direction of the second horizontal plate 112, a second auxiliary restriction 118A projecting in the front-rear direction is formed. The second auxiliary restriction 118A has a smaller width in the left-right direction than that of the second restriction 118.

The first vertical plate 114 and the third vertical plate 116 have a symmetric shape about the second vertical plate 115. The first vertical plate 114, the second vertical plate 115, and the third vertical plate 116 are provided on both left and right sides with the second opening portion 133 interposed therebetween. Also, the first vertical plate 114, the second vertical plate 115, and the third vertical plate 116 have the same shape except for positions where an outer edge of the second opening portion 133 is formed. In other words, the vertical plates have the same shape except sizes of removed portions to form the second opening portion 133. Hereinafter, a shape of the third vertical plate 116 will be described, and descriptions on the shapes of the first vertical plate 114 and the second vertical plate 115 will be omitted.

As shown in FIG. 6A, at an end in the left direction of the third vertical plate 116, a third restriction 119 projecting in the up-down direction is formed. Also, at an end in the right direction of the third vertical plate 116, a fourth restriction 120 projecting in the up-down direction is formed. That is, each of the first restriction 117, the second restriction 118, the second auxiliary restriction 118A, the third restriction 119, and the fourth restriction 120 projects towards the inner wall surface 3C of the filling chamber 3.

Also, an end in the right direction of the third vertical plate 116 is provided with an inclined surface 116A inclined so as to protrude towards the right side with increasing separation in the up-down direction from the central axis of the filling chamber 3.

Also, as shown in FIG. 5, a clearance 134 is formed between the third vertical plate 116 and the inner wall surface 3C of the filling chamber 3 except the third restriction 119 at a left end portion and the fourth restriction 120 at a right end portion along an outer periphery of the third vertical plate 116. Similarly, in each of the first horizontal plate 111, the second horizontal plate 112, and the third horizontal plate 113, a clearance (not shown) is formed between each horizontal plate and the inner wall surface 3C except end portions with the first restriction 117 and the second restriction 118 along an outer periphery of each horizontal plate.

Also, the partition 104 is formed to be sufficiently shorter than a length in the left-right direction of the inside of the filling chamber 3. Thus, when the partition 104 is mounted so as to be aligned to the left side, a space 135 is formed on the right side of the partition 104.

[2-2. Effect]

According to the second embodiment detailed in the above, the partition 104 comprises a configuration corresponding to the partition 4. Thus, it is possible to obtain similar effects as the effects (1a) to (1f) described in the first embodiment. In addition, the partition 104 is configured by plates assembled in a lattice shape, which imparts very high strength.

3. Other Embodiments

The embodiments of the present disclosure have been described in the above. However, the present disclosure is not limited to the embodiments described above, and may take various forms within a technical scope of the present disclosure.

(3a) Each component of the canister of the present disclosure is not limited to the configurations disclosed in the above embodiments. For example, a shape of the filling chamber 3, and positions and shapes of the charge port 2A and the atmosphere port 2B are not particularly limited.

(3b) The partition can employ various configurations as long as the partition comprises the plate-like members, forms at least three flow paths, and has the opening portion configured to allow the evaporated fuel to be transferred among the at least three flow paths. For example, the plate-like member may not be limited to a flat plate, and the plate-like member may have a curved plate-shape. The opening portion may not communicate with all flow paths configured by the partition, and the opening portion may only be configured to communicate with at least three flow paths to allow the evaporated fuel to be transferred among the at least three flow paths. Also, the partition may not be integrally formed, and the plate-like members may be separated to two or more portions.

Also, the shapes of the left and right ends of the partition, a shape of the through hole forming the opening portion, and an arrangement of the plate-like members can be changed in various forms.

When the opening portion communicates with all flow paths, the imbalance in the flow of the evaporated fuel can be further reduced, and thus, utilization efficiency of the activated carbon can improve.

(3C) Some functions achieved by a single component in the above embodiments may be distributed to components, or some functions achieved by components may be integrated into a single component. Also, a part of a configuration in the above embodiments may be omitted. Further, it may be possible to add or substitute at least a part of a configuration in the above embodiments to a configuration in other embodiments described above. It is to be noted that any aspects within the technical idea specified from the wording of the claims are embodiments of the present disclosure.

What is claimed is:

1. A canister configured for absorbing and desorbing evaporated fuel generated in a fuel tank of a vehicle, comprising:
    a filling chamber configured to be filled with activated carbon; and
    a partition arranged in the filling chamber, the partition having plate-like members extending in a flow direction, the flow direction being a direction where the evaporated fuel flows,
    wherein each of the plate-like members is connected and is in contact with at least one other of the plate-like members, and
    wherein the partition forms at least three flow paths defined by the plate-like members, and the partition includes an opening portion defined by the plate-like members, the opening portion communicating with the at least three flow paths and allowing the evaporated fuel to move in a direction crossing the flow direction.

2. The canister according to claim 1,
    wherein the partition includes a restriction projecting towards an inner wall surface of the filling chamber, the restriction being configured for restricting a movement range of the partition in the direction crossing the flow direction.

3. The canister according to claim 1,
    wherein at least a portion in at least one end of each of the plate-like members has a tapered shape in the flow direction.

4. The canister according to claim 1,
    wherein in the partition, each of the plate-like members includes a first edge forming an outer edge of the opening portion, and at least one end of the first edge has a curved shape in the flow direction.

5. The canister according to claim 1,
wherein a clearance along the flow direction is formed between (i) an inner wall surface of the canister that bounds the filling chamber and (ii) at least a part of the plate-like members.

6. The canister according to claim 1,
wherein the canister comprises a central axis parallel to the plate like-members, and the plate-like members project radially outward from the central axis.

7. A canister configured for absorbing and desorbing evaporated fuel generated in a fuel tank of a vehicle, comprising:
a filling chamber configured to be filled with activated carbon; and
a partition arranged in the filling chamber, the partition having plate-like members extending in a flow direction, the flow direction being a direction where the evaporated fuel flows,
wherein each of the plate-like members is connected and is in contact with at least one other of the plate-like members, and
wherein the partition forms at least three flow paths defined by the plate-like members, and the partition includes an opening portion communicating with the at least three flow paths, and
wherein the partition includes a restriction projecting, relative to a circumference of the partition, towards an inner wall surface of the canister that bounds the filling chamber, the restriction being configured for restricting a movement range of the partition in a direction crossing the flow direction.

8. The canister according to claim 7,
wherein at least a portion in at least one end of each of the plate-like members has a tapered shape in the flow direction.

9. The canister according to claim 7,
wherein in the partition, each of the plate-like members includes a first edge forming an outer edge of the opening portion, and at least one end of the first edge has a curved shape in the flow direction.

10. The canister according to claim 7,
wherein a clearance along the flow direction is formed between an inner wall surface of the filling chamber and at least a part of the plate-like members along the flow direction, the at least a part of the plate-like members excluding a portion of the partition provided with the restriction.

11. The canister according to claim 7,
wherein the canister comprises a central axis parallel to the plate like-members, and the plate-like members project radially outward from the central axis.

12. The canister according to claim 1, wherein the canister comprises a first port at a first end and a second port at a second end that opposes the first end, and the flow direction is predominantly in a direction extending from the first end to the second end.

13. The canister according to claim 7, wherein the canister comprises a first port at a first end and a second port at a second end that opposes the first end, and the flow direction is predominantly in a direction extending from the first end to the second end.

* * * * *